US011953780B2

(12) United States Patent
Fang (10) Patent No.: US 11,953,780 B2
(45) Date of Patent: Apr. 9, 2024

(54) BACKLIGHT MODULE AND DISPLAY DEVICE (71) Applicant: SUZHOU CHINA STAR OPTOELECTRONICS TECHNOLOGY CO., LTD., Jiangsu (CN)

(72) Inventor: Lian Fang, Jiangsu (CN)

(73) Assignee: SUZHOU CHINA STAR OPTOELECTRONICS TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/328,762

(22) Filed: Jun. 4, 2023

(65) Prior Publication Data
US 2024/0053634 A1 Feb. 15, 2024

(30) Foreign Application Priority Data
Aug. 12, 2022 (CN) .......................... 202210967271.9

(51) Int. Cl.
G02F 1/13357 (2006.01)
(52) U.S. Cl.
CPC .. *G02F 1/133603* (2013.01); *G02F 1/133606* (2013.01)
(58) Field of Classification Search
CPC ................................................ G02F 1/133603
See application file for complete search history.

(56) References Cited

U.S. PATENT DOCUMENTS

| | | | |
|---|---|---|---|
| 9,638,905 B1* | 5/2017 | Dai | G02B 27/1066 |
| 2017/0343857 A1* | 11/2017 | Dai | H01J 17/49 |
| 2020/0388636 A1* | 12/2020 | Yueh | H01L 27/124 |
| 2021/0116749 A1* | 4/2021 | Kao | G02F 1/133602 |
| 2022/0102476 A1* | 3/2022 | Kim | H10K 59/1213 |

FOREIGN PATENT DOCUMENTS

| | | |
|---|---|---|
| CN | 109387981 A | 2/2019 |
| CN | 112596303 A | 4/2021 |
| CN | 113327515 A | 8/2021 |
| CN | 215264316 U | 12/2021 |
| CN | 114527599 A | 5/2022 |
| CN | 114627749 A * | 6/2022 |
| CN | 114627749 A | 6/2022 |
| CN | 114973985 A * | 8/2022 |

OTHER PUBLICATIONS

English translation of Wang CN-114627749-A, published Jun. 2022 (Year: 2022).*
English translation of Xiang CN-114973985-A, published Aug. 2022 (Year: 2022).*
Chinese Office Action issued in corresponding Chinese Patent Application No. 202210967271.9 dated Nov. 8, 2023, pp. 1-7.

* cited by examiner

*Primary Examiner* — Evan P Dzierzynski
(74) *Attorney, Agent, or Firm* — PV IP PC; Wei Te Chung; Zhigang Ma (57) ABSTRACT

The present application provides a backlight module and a display device. The backlight module includes at least two light-emitting diode (LED) lamp boards and a light refraction structure. A splicing seam is between two adjacent LED lamp boards. The light refraction structure is disposed on a light-emitting side of the LED lamp boards and covering the splicing seam. Side surfaces of the light refraction structure adjacent to the two adjacent LED lamp boards are a first refraction surface and a second refraction surface.

18 Claims, 4 Drawing Sheets

BACKLIGHT MODULE AND DISPLAY DEVICE

FIELD OF INVENTION

The present application relates to a field of display technology, and particularly relates to a backlight module and a display device.

BACKGROUND OF INVENTION

Backlight modules are important components of liquid crystal display devices. At present, light sources of the backlight modules are mainly composed of light-emitting diodes (LED) in an array. Mini light-emitting diodes (Mini LED) are direct-type display backlight sources, and mini LED backlight technology has many obvious advantages over traditional LED backlight technology. The mini LED backlight technology is capable of achieving regional brightness adjustment through regional dimming control, thereby bringing a better visual experience to customers.

Although existing mini LED display products have advantages of energy saving, light weight, wide color gamut, high contrast, and fine dynamic zoning, there are also some technical defects that may not be ignored in mini LED direct-type display backlight modules. For the liquid crystal display devices with large sizes, existing mini LED light sources are spliced by a quantity of LED lamp boards. Therefore, there are splicing seams between the quantity of LED lamp boards. There are no light sources at the splicing seams, so that a brightness of the display devices at the splicing seams is low, resulting in shadows at the splicing seams of the display devices.

SUMMARY

The present application provides a backlight module and a display device, so as to solve a problem that there are shadows at splicing seams of existing display devices.

The present application provides a backlight module including:
- at least two light-emitting diode (LED) lamp boards arranged in parallel, wherein a splicing seam is between two adjacent LED lamp boards; and
- a light refraction structure disposed on a light-emitting side of the LED lamp boards and covering the splicing seam, wherein side surfaces of the light refraction structure adjacent to the two adjacent LED lamp boards are a first refraction surface and a second refraction surface.

Optionally, both the first refraction surface and the second refraction surface are cambered surfaces.

Optionally, a radius of each of the cambered surfaces gradually decreases along a light-emitting direction of the LED lamp boards.

Optionally, a light reflection film layer is disposed on a bottom surface of the light refraction structure.

Optionally, at least one of the first refraction surface and the second refraction surface is provided with grooves.

Optionally, there are a plurality of grooves; the LED lamp boards include a printed circuit board and LED lamps arranged on the printed circuit board in an array, and each of the plurality of grooves corresponds to each row of the LED lamps on the LED lamp boards adjacent to the plurality of grooves.

Optionally, an orthogonal projection of each row of the LED lamps on the light refraction structure is located in one of the plurality of grooves corresponding to the LED lamps.

Optionally, widths of the plurality of grooves in a column direction gradually decrease along a light-emitting direction of the LED lamp boards.

Optionally, a contour curve of a cross-sectional shape of each of the plurality of grooves parallel to a light-emitting plane of the LED lamp boards satisfies a following curve equation:

$$\frac{X^2}{a^2} + \frac{Y^2}{b^2} = 1,$$

where a is greater than 0, b is greater than 0, X is a coordinate value of a point on the contour curve on an x-axis, and Y is a coordinate value of the point on the contour curve on a y-axis.

Optionally, the X ranges between −2.81 mm, and 2.81 mm.

Optionally, further including:
- a diffuser plate disposed on the light-emitting side of the LED lamp boards and located above the light refraction structure.

Optionally, a top of the light refraction structure abuts a bottom surface of the diffuser plate.

The present application further provides a display device including a display panel and a backlight module abovementioned, the display panel and the backlight module are opposite to each other.

The present application provides the backlight module and the display device. The backlight module includes the at least two LED lamp boards and the light refraction structure. The LED lamp boards are arranged in parallel. The light refraction structure is disposed on the light-emitting side of the LED lamp boards and covers the splicing seam. The side surfaces of the light refraction structure adjacent to the two adjacent LED lamp boards are the first refraction surface and the second refraction surface. In the present application, the light refraction structure is disposed on the light-emitting side of the LED lamp boards, and the light refraction structure covers the splicing seam, so that light of the adjacent two LED lamp boards directed to the light refraction structure is refracted and then emitted from positions of the splicing seam, thereby improving brightness of the splicing seam and solving the technical problem that there are shadows at the splicing seam of the display device.

DESCRIPTION OF DRAWINGS

To describe technical solutions of embodiments of the present application more clearly, the following briefly introduces accompanying drawings used in a description of the embodiments of the present application. Apparently, the accompanying drawings described below illustrate only some exemplary embodiments of the present application, and persons skilled in the art may derive other drawings from the drawings without making creative efforts.

DETAILED DESCRIPTION OF EMBODIMENTS

The technical solutions in embodiments of the present application will be described clearly and completely hereafter with reference to the accompanying drawings. Apparently, described embodiments are only a part of but not all embodiments of the present application. All other embodiments obtained by persons of ordinary skill in the art based on the embodiments of the present application without creative efforts shall fall within a protection scope of the present application.

In description of the present application, it should be understood that orientational or positional relationships represented by directional terms mentioned in the present application, such as central, longitudinal, width, up, down, front, rear, left, right, inside, outside, etc., are orientational or positional relationships based on the drawings, and are merely for the convenience of describing the present application and simplifying the description, rather than indicating or implying that the device or element is intended to have a particular orientation, or is constructed and operated in a particular orientation, and therefore, should not be interpreted as a limitation of the application. In addition, terms such as "first" and "second" are used herein for purposes of description, and should not be interpreted as indication or implication of relative importance, or implied indication of a number of the technical features. Therefore, features limited by terms such as "first" and "second" may explicitly or impliedly include one or more than one of these features. In description of the present application, "a plurality of" means two or more than two, unless otherwise specified.

In description of the present application, unless otherwise specified and defined, terms "connected with", "mounted", "connected" and "fixed" should be understood in a broad sense, for example, it may be a fixed connection, a detachable connection, or a whole; it may be a mechanical connection or an electrical connection; it may be a directly connection or an indirectly connection through an intermediate media; and it may be an internal connection of two components or an interaction relationship between two components. For those skilled in the art, meanings of the above terms in the present application can be understood according to situations.

The present application provides a backlight module and a display device, which will be described in detail below. It should be noted that a description order of following embodiments is not limited to a preferred order of the embodiments of the present application.

Figure 1:
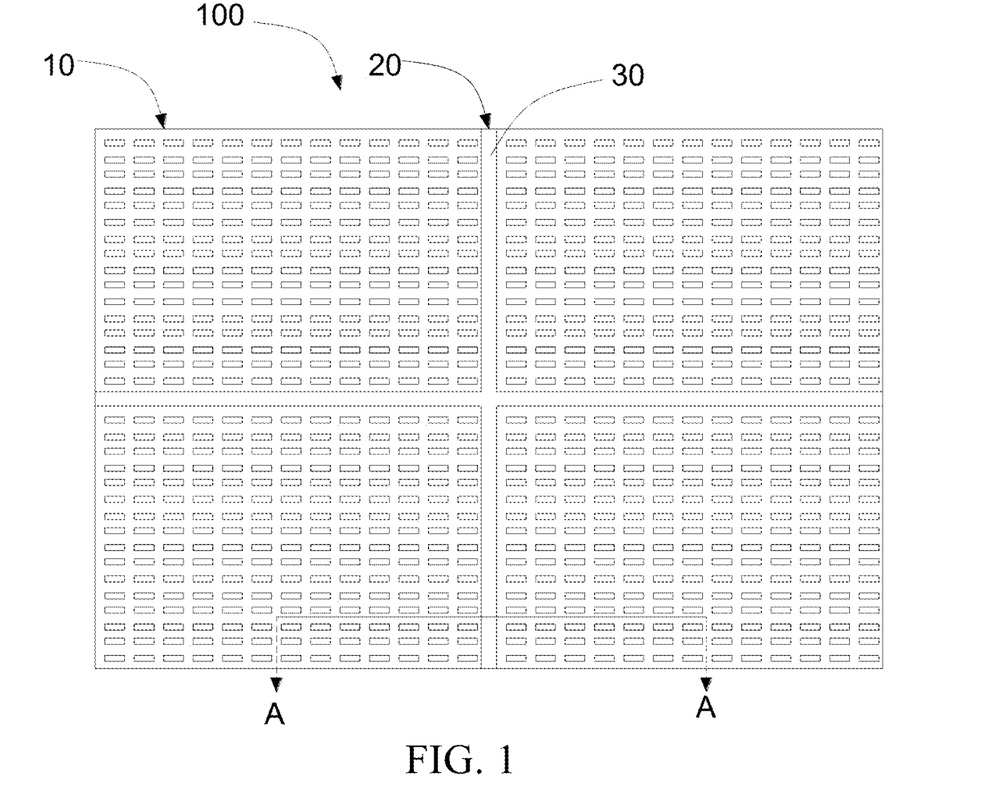
FIG. 1 is a schematic diagram of a first structure of a backlight module provided by the present application.
Figure 2:
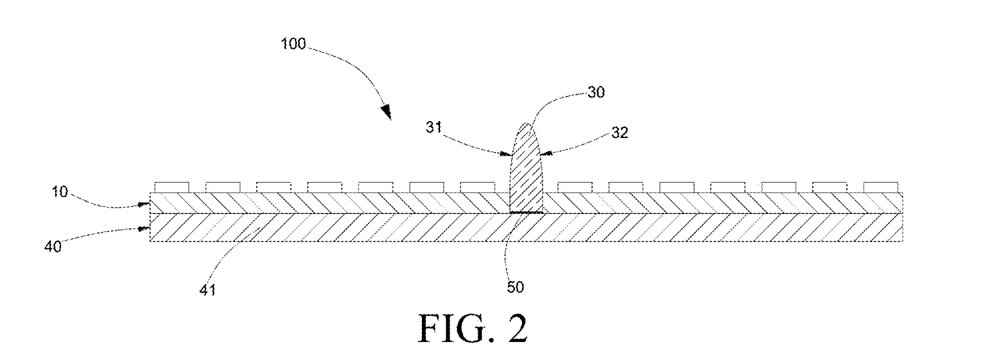
FIG. 2 is a first schematic diagram of an A-A section in FIG. 1.

Referring to FIG. 1 and FIG. 2, FIG. 1 is a schematic diagram of a first structure of a backlight module provided by the present application. FIG. 2 is a first schematic diagram of an A-A section in FIG. 1. The present application provides a backlight module 100. The backlight module 100 includes light-emitting diode (LED) lamp boards 10 and a light refraction structure 30.

There are at least two LED lamp boards 10 arranged in parallel. A splicing seam 20 is between two adjacent LED lamp boards 10. The light refraction structure 30 is disposed on a light-emitting side of the LED lamp boards 10 and covers the splicing seam 20. Side surfaces of the light refraction structure 30 adjacent to one of the two adjacent LED lamp boards 10 is a first refraction surface, and the side surfaces of the light refraction structure 30 adjacent to another one of the two adjacent LED lamp boards 10 is a second refraction surface.

In some embodiments, there are four LED lamp boards 10. The four LED lamp boards 10 are arranged in a 2×2 matrix. The splicing seam 20 is between the two adjacent LED lamp boards 10.

Since there are no light sources at the splicing seam 20 between the two adjacent LED lamp boards 10, so a brightness of an existing backlight module at the splicing seam 20 is low, resulting in a problem that there are shadows at the splicing seam 20 of the backlight module. In the present application, the light refraction structure 30 is disposed on the light-emitting side of the LED lamp boards 10, and the light refraction structure 30 covers the splicing seam 20 between the two adjacent LED lamp boards 10, so that light of the adjacent two LED lamp boards 10 directed to the light refraction structure 30 is refracted and emitted from positions of the splicing seam 20, thereby improving a brightness of the splicing seam 20 and solving the technical problem that the display device has shadows at the splicing seam 20.

Specifically, the light refraction structure 30 is made of a transparent material, and the transparent material is polymethyl methacrylate or other transparent materials capable of generating light refraction.

In some embodiments, the first refraction surface of the light refraction structure 30 includes a first cambered surface 31. If the refraction surface of the light refraction structure 30 adjacent to one of the adjacent two LED lamp boards 10 is an inclined surface, when the light emitted from the LED lamp boards 10 irradiates the inclined surface, most of the light emitted by the LED lamp boards 10 easily penetrates the light refraction structure 30. Relative to the inclined surface or a plane surface, the first cambered surface 31 is capable of refracting more light emitted from the LED lamp boards 10 to a middle position of the light refraction structure 30. The middle position of the light refraction structure 30 is a position located directly above the splicing seam 20, thereby effectively improving the brightness of the backlight module at the splicing seam 20.

Furthermore, a radius of the first cambered surface 31 gradually decreases along a light-emitting direction of the LED lamp boards 10, so that the light emitted from the LED lamp boards 10 may be further converged in the middle position of the light refraction structure 30 after being refracted by the light refraction structure 30, thereby realizing better light converge effect. That is, the radius of the first cambered surface 31 of the light refraction structure 30 adjacent to one of the adjacent two LED lamp boards 10 gradually decreases along the light-emitting direction of the LED lamp boards 10.

In some embodiments, the second refraction surface of the light refraction structure 30 includes a second cambered surface 32. If the refraction surface of the light refraction structure 30 adjacent to another one of the adjacent two LED lamp boards 10 is an inclined surface, when the light emitted from the LED lamp boards 10 irradiates the inclined surface, most of the light emitted by the LED lamp boards 10 easily penetrates the light refraction structure 30. Relative to the inclined surface or the plane surface, the second cambered surface 32 is capable of refracting more light emitted from the LED lamp boards 10 to the middle position of the light refraction structure 30. The middle position of the light refraction structure 30 is the position located directly above the splicing seam 20, thereby further effectively improving the brightness of the backlight module at the splicing seam 20.

Furthermore, a radius of the second cambered surface 32 gradually decreases along the light-emitting direction of the LED lamp boards 10, so that the light emitted from the LED lamp boards 10 may be further converged in the middle position of the light refraction structure 30 after being refracted by the light refraction structure 30, thereby realizing better light concentrating effect. That is, the radius of the second cambered surface 31 of the light refraction structure 30 adjacent to another one of the adjacent two LED lamp boards 10 gradually decreases along the light-emitting direction of the LED lamp boards 10.

In addition, the first cambered surface 31 and the second cambered surface 32 may be symmetrically or asymmetrically disposed. When the first cambered surface 31 and the second cambered surface 32 are symmetrically disposed, that is, the radius of points at a same horizontal position of the first cambered surface 31 and the second cambered surface 32 are equal. When the first cambered surface 31 and the second cambered surface 32 are asymmetrically disposed, the radius of the points at the same horizontal position of the first cambered surface 31 and the second cambered surface 32 are not equal.

Furthermore, in some embodiments, a light reflection film layer 50 is disposed on a side surface of the light refraction structure 30 away from the light-emitting direction of the LED lamp boards 10. That is, the light reflection film layer 50 is disposed on a bottom surface of the light refraction structure 30. In the present application, the light reflection film layer 50 is disposed on the bottom surface of the light refraction structure 30, so that the light directed to the light refraction structure 30 away from the light-emitting side of the LED lamp boards 10 may be reflected back, after the light is refracted, thereby improving the brightness of the splicing seam 10 and improving the shadows of the backlight module at the splicing seam 10.

The light reflection film layer 50 includes a transparent nano-coating layer or a diffuse reflection coating layer. The transparent nano-coating layer has high total reflectivity and diffuse reflectivity, thereby having a better reflection effect. A material of the diffuse reflection coating layer is composed of a base material, a diffuse reflection material, a high thermal conductivity material, a filler, etc. A formation of the diffuse reflection coating layer is as follows: spraying or dispensing the diffuse reflection materials on a side surface of the light refraction structure 30 away from the light-emitting direction of the LED lamp boards 10, so as to uniformly form a high diffuse reflective white coating layer. The high diffuse reflective white coating layer may be an aqueous acrylic coating layer.

Furthermore, the backlight module 100 further includes a backplate 40. The backplate 40 includes a bottom plate 41. The at least two LED lamp boards 10 are arranged in parallel at a side of the bottom plate 41. The light refraction structure 30 is fixedly connected with the bottom plate 41 through the splicing seam 20. That is, the light reflection film layer 50 is disposed on the side surface of the light refraction structure 30 away from the light-emitting direction of the LED lamp boards 10, and then fixedly connected with the bottom plate 41 through a glue.

In some embodiments, the light reflection film layer 50 is disposed on a side surface of the bottom plate 41 located in the splicing seam 20, and the LED lamp boards 10 are disposed on the side surface of the bottom plate 41. The light reflection film layer 50 includes the transparent nano-coating layer or the diffuse reflection coating layer. The transparent nano-coating layer has high total reflectivity and diffuse reflectivity, thereby having the better reflection effect. In the present application, the light reflection film layer 50 is coated on the bottom plate 41 to reflect back the light leaking from the light refraction structure 30, thereby reducing loss of the light and further improving the brightness of the splicing seam 20.

In some embodiments, an end of the light refraction structure 30 away from the light-emitting direction of the LED lamp boards 10 is located in the splicing seam 20 and fixed connected with the bottom plate 41. Specifically, the end of the light refraction structure 30 away from the light-emitting direction of the LED lamp boards 10 are fixed connected with the bottom plate 41 through the glue.

Figure 3:
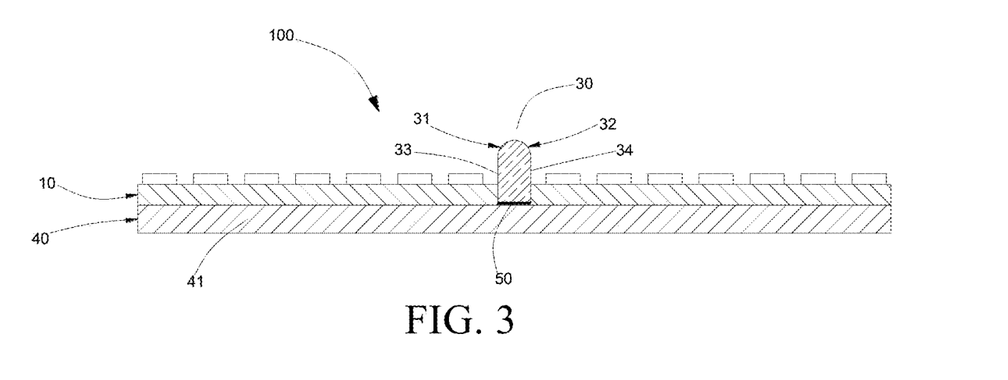
FIG. 3 is a second schematic diagram of the A-A section in FIG. 1.

Referring to FIG. 3, FIG. 3 is a second schematic diagram of the A-A section in FIG. 1. In some embodiments, both the first refraction surface 31 and the second refraction surface 32 of the light refraction structure 30 are cambered surfaces. The refraction surface of the light refraction structure 30 adjacent to one of the adjacent two LED lamp boards 10 further includes a first plane surface 33 and a second plane surface 34, and the first plane surface 33 and the second plane surface 34 are parallel to a normal direction of the LED lamp boards 10. The first plane surface 33 is connected with the first cambered surface 31, and the first plane surface 33 is adjacent to the LED lamp boards 10. The second plane surface 34 is connected with the second cambered surface 32, and the second plane surface 34 is adjacent to the LED lamp boards 10. When the first cambered surface 31 of the light refraction structure 30 is the cambered surface with a short length in the normal direction of the LED lamp boards 10, a length of the light refraction structure 30 in the normal direction of the LED lamp boards 10 may be increased by providing with the first plane surface 33, so that the light refraction structure 30 may support a diffuser plate while ensuring that space of a cavity of the backlight module is large enough.

Figure 4:
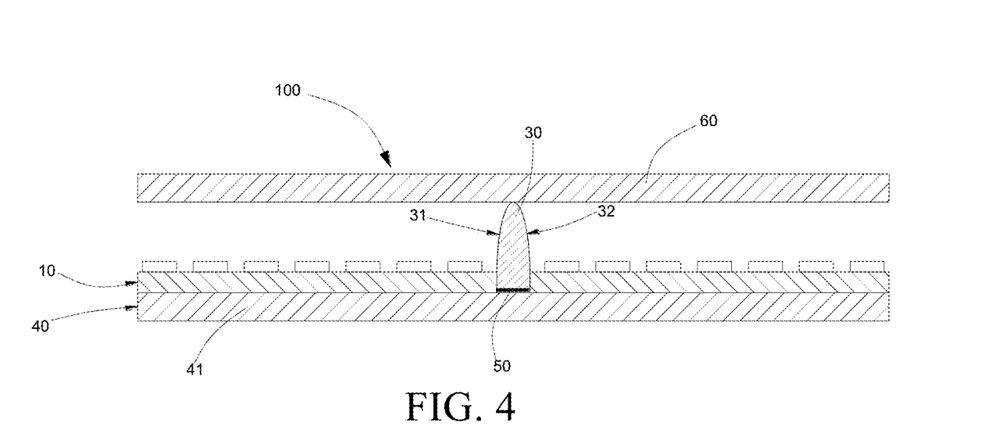
FIG. 4 is a schematic diagram of a second structure of the backlight module provided by the present application.

Referring to FIG. 4, FIG. 4 is a schematic diagram of a second structure of the backlight module provided by the present application. In some embodiments, the backlight module further includes a diffuser plate 60. The diffuser plate 60 is disposed on the light-emitting side of the LED lamp boards 10 and located above the light refraction structure 30.

Furthermore, a top of the light refraction structure 30 abuts a bottom surface of the diffuser plate 60. That is, the end of the light refraction structure 30 away from the LED lamp boards 10 abuts the diffuser plate 60.

That is, in the present application, the end of the light refraction structure 30 away from the LED lamp boards 10 abuts the diffuser plate 60, so that the light refraction structure 30 may support the diffuser plate 60 to prevent the diffuser plate 60 with thinner thickness from sagging at the splicing seam 20, thereby avoiding uneven display of the screen brightness caused by changes in part of the cavity of the backlight module.

In addition, the end of the light refraction structure 30 away from the LED lamp boards 10 is the cambered surface, thereby preventing the light refraction structure 30 from breaking the diffuser plate 60.

Figure 5:
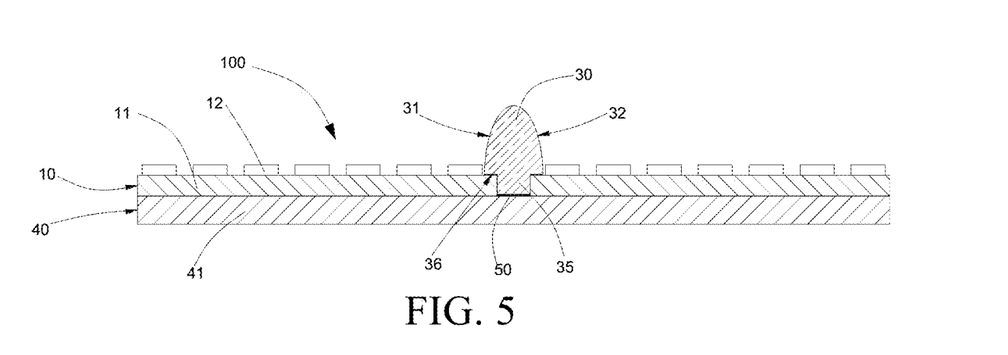
FIG. 5 is a schematic diagram of a third structure of the backlight module provided by the present application.

Referring to FIG. 5, FIG. 5 is a schematic diagram of a third structure of the backlight module provided by the present application. A boss 35 protruding in a direction toward the bottom plate 41 is disposed on the side surface of the light refraction structure 30 away from the light-emitting direction of the LED lamp boards 10. The boss 35 is located in the splicing seam 20 and fixed connected with the bottom plate 41. The light refraction structure 30 is clamped in the splicing seam 20 through the boss 35, so that the light refraction structure 30 may be quickly positioned and installed. Specifically, the boss 35 is fixedly connected with the bottom plate 41 by the glue.

Furthermore, the LED lamp boards 10 include a printed circuit board 11 and LED lamps 12 arranged on the printed circuit board 11. The LED lamps 12 are mini-LEDs. The side surface of the light refraction structure 30 away from the light-emitting direction of the LED lamp boards 10 includes two supporting surfaces 36, and the two supporting surfaces 36 are located on both sides of the boss 35. The two supporting surfaces 36 are respectively disposed on the printed circuit board 11 of the two adjacent LED lamp boards 10.

That is, the light refraction structure 30 is disposed on the printed circuit board 11 of the two adjacent LED lamp boards 10 through the two supporting surfaces 36 to increase a volume of the light refraction structure 30, so that the first refraction surface 31 the second refraction surface 32 of the light refraction structure 30 have a larger area. The greater the area of the first refraction surface 31 and the second refraction surface 32 of the light refraction structure 30, the more light refracted by the first refraction surface 31 and the second refraction surface 32 of the light refraction structure 30, and the more light emitted from the splicing seam 20, thereby improving light refraction effect of the light refraction structure 30.

Furthermore, the side surface of the light refraction structure 30 away from the light-emitting direction of the LED lamp boards 10 includes the two supporting surfaces 36 located on both sides of the boss 35, so as to increase to the area of the side surface of the light refraction structure 30 away from the light-emitting direction of the LED lamp boards 10. And the light reflection film layer 50 is disposed on the side surface of the light refraction structure 30 away from the light-emitting direction of the LED lamp boards 10, thereby further improving the refraction effect of the light refraction structure 30 to improve the brightness of the backlight module.

Figure 6:
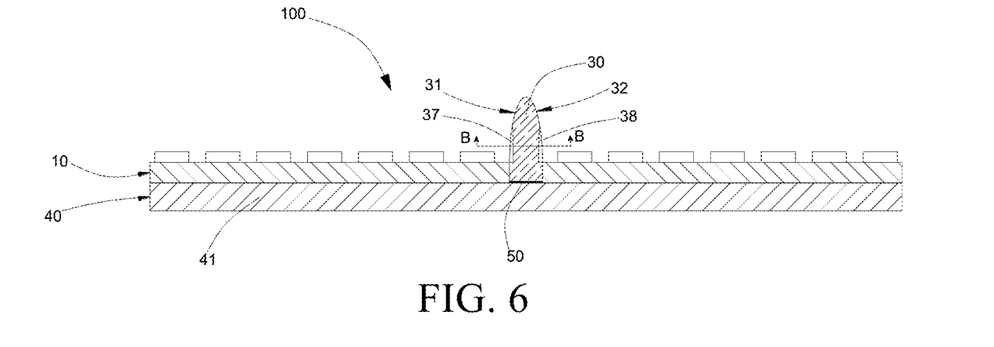
FIG. 6 is a schematic diagram of a fourth structure of the backlight module provided by the present application.
Figure 7:
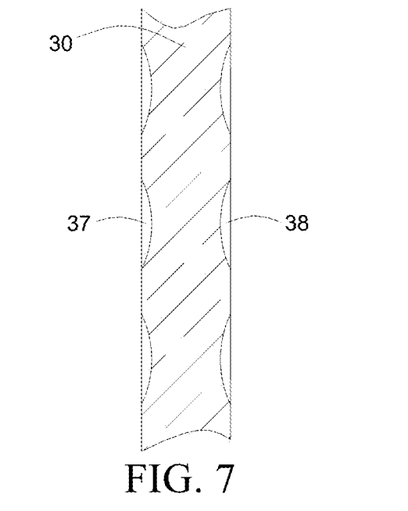
FIG. 7 is a second schematic diagram of a B-B section in FIG. 6.
Figure 8:
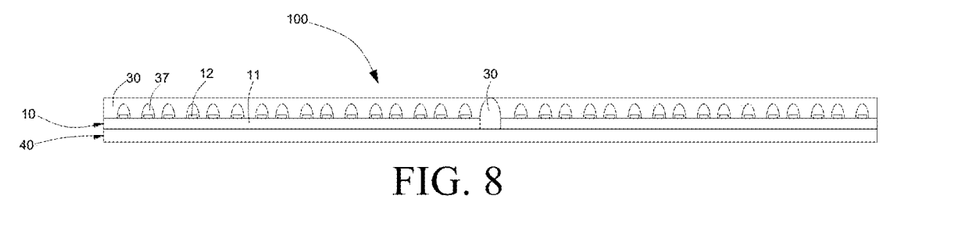
FIG. 8 is a left-side schematic diagram of the fourth structure of the backlight module provided by the present application.

Referring to FIG. 6 to FIG. 8, FIG. 6 is a schematic diagram of a fourth structure of the backlight module provided by the present application. FIG. 7 is a second schematic diagram of a B-B section in FIG. 6. FIG. 8 is a left-side schematic diagram of the fourth structure of the backlight module provided by the present application. In some embodiments, the first refraction surface 31 of the light refraction structure 30 adjacent to one of the two adjacent LED lamp boards 10 is provided with first grooves 37.

In the present application, the light of one of the two adjacent LED lamp boards 10 may be converged by providing the first grooves 37. The light after being converged is refracted by the light refraction structure 30 and then emitted from the splicing seam 20, thereby further improving the brightness of the splicing seam 20 and solving the technical problem that there are shadows at the splicing seam 20 of the display device.

Furthermore, there are a plurality of the first grooves 37. The LED lamp boards 10 include the printed circuit board 11 and the LED lamps 12 arranged on the printed circuit board 11 in the array. Each of the plurality of first grooves 37 corresponds to each row of the LED lamps 12 on the adjacent LED lamp boards 10. Therefore, light of each row of the LED lamps 12 may be converged, refracted, and then emitted from the splicing seam 20. The LED lamps 12 are mini LEDs.

Furthermore, as shown in FIG. 8, an orthogonal projection of each row of the LED lamps 12 on the light refraction structure 30 is located in one of the plurality of first grooves 37 corresponding to the LED lamps 12. That is, a height of each of the first grooves 37 is greater than a height of each row of the LED lamps 12. Compared that the first refraction surface 31 is not provided with the first grooves 37, an area of a corresponding area on the first refractive surface 31 is greater, and more light emitted by the LED lamps 12 may enter the light refraction structure 30 through surfaces of the first grooves 37. After the light enters inside the light refraction structure 30, the light is dispersed and conducted in all directions to make the light emitted from the top of the light refraction structure 30 more uniform, thereby effectively avoiding an abnormal brightness concentration area at the splicing seam 20. In contrast, when the first grooves 37 are not provided on the first refraction surface 31, the light emitted from the LED lamps 12 directly enters inside the light refraction structure 30, and the light is not be dispersed and conducted. The light emitted from the LED lamps 12 is refracted from the light-refracting structure 30. After the light emitted from each of the LED lamps 12 being refracted from the light-refracting structure 30, the light emitted from the top of the light refraction structure 30 is relatively concentrated, so that there are a plurality of brightness abnormal concentration areas corresponding to the LED lamps 12 at the splicing seam 20.

Furthermore, widths of the plurality of first grooves 37 in a column direction gradually decrease along the light-emitting direction of the LED lamp boards 10. Since the light needs to be emitted from the splicing seam 20 after being refracted by the light refraction structure 30, the widths of the plurality of first grooves 37 at positions adjacent to the LED lamp boards 10 are set to be greater, so that the positions adjacent to the LED lamp boards 10 may gather more light of the LED lamp boards 10. And the widths of the plurality of first grooves 37 at the positions away from the LED lamp boards 10 are set to be less, so as to avoid influence of the refraction effect caused by the widths of the first grooves 37 at the positions away from the LED lamp boards 10 being too greater.

Specifically, a contour curve of a cross-sectional shape of each of the plurality of first grooves 37 parallel to a light-emitting plane of the LED lamp boards 10 satisfies a following curve equation:

$$\frac{X^2}{a^2} + \frac{Y^2}{b^2} = 1,$$

where a is greater than 0, b is greater than 0, X is a coordinate value of a point on the contour curve on an x-axis, and Y is a coordinate value of a point on the contour curve on a y-axis.

After many studies and tests by the applicant, it is known that when the cross-sectional shape of the first grooves 37 satisfies an elliptic curve equation, the backlight module has best brightness effect at the splicing seam 20.

Furthermore, the X ranges between −2.81 mm, and 2.81 mm. The a is greater than 0, and less than or equal to 5.7. The b is greater than 0, and less than or equal to 3.15. Correspondingly, the Y ranges between 2.62 mm, and 3.15 mm.

In some embodiments, the second refraction surface 32 of the light refraction structure 30 adjacent to another one of the two adjacent LED lamp boards 10 is provided with second grooves 38. Compared that the second refraction surface 32 is not provided with the second grooves 38, an area of a corresponding area on the second refractive surface 32 is greater, and more light emitted by the LED lamps 12 may enter the light refraction structure 30 through surfaces of the second grooves 38. After the light enters inside the light refraction structure 30, the light is dispersed and conducted in all directions to make the light emitted from the top of the light refraction structure 30 more uniform, thereby effectively avoiding the abnormal brightness concentration area at the splicing seam 20. In contrast, when the second grooves 38 are not provided on the second refraction surface 32, the light emitted from the LED lamps 12 directly enters inside the light refraction structure 30 from the second refraction surface 32, and the light is not be dispersed and conducted. After the light emitted from each of the LED lamps 12 being refracted from the light-refracting structure 30, the light emitted from the top of the light refraction structure 30 is relatively concentrated, so that there are the plurality of brightness abnormal concentration areas corresponding to the LED lamps 12 at the splicing seam 20.

In the present application, the light of another one of the two adjacent LED lamp boards 10 may be converged by providing the second grooves 38. The light after being converged is refracted by the light refraction structure 30 and then emitted from the splicing seam 20, thereby further improving the brightness of the splicing seam 20 and solving the technical problem that there are shadows at the splicing seam 20 of the display device.

Furthermore, there are a plurality of the second grooves 38. The LED lamp boards 10 include the printed circuit board 11 and the LED lamps 12 arranged on the printed circuit board 11 in the array. Each of the plurality of second grooves 38 corresponds to each row of the LED lamps 12 on the adjacent LED lamp boards 10. Therefore, the light of each row of the LED lamps 12 may be converged, refracted, and then emitted from the splicing seam 20. The LED lamps 12 are mini LEDs.

Furthermore, the orthogonal projection of each row of the LED lamps 12 on the light refraction structure 30 is located in one of the plurality of second grooves 38 corresponding to the LED lamps 12. That is, a height of each of the second grooves 38 is greater than the height of each row of the LED lamps 12.

Furthermore, widths of the plurality of second grooves 38 in the column direction gradually decrease along the light-emitting direction of the LED lamp boards 10. Since the light needs to be emitted from the splicing seam 20 after being refracted by the light refraction structure 30, the widths of the plurality of second grooves 38 at positions adjacent to the LED lamp boards 10 are set to be greater, so that the positions adjacent to the LED lamp boards 10 may gather more light of the LED lamp boards 10. And the widths of the plurality of second grooves 38 at the positions away from the LED lamp boards 10 are set to be less, so as to avoid the influence of the refraction effect caused by the widths of the second grooves 38 at the positions away from the LED lamp boards 10 being too greater.

Specifically, a contour curve of a cross-sectional shape of each of the plurality of second grooves 38 parallel to the light-emitting plane of the LED lamp boards 10 satisfies a following curve equation:

$$\frac{X^2}{a^2} + \frac{Y^2}{b^2} = 1,$$

where a is greater than 0, b is greater than 0, X is a coordinate value of a point on the contour curve on an x-axis, and Y is a coordinate value of a point on the contour curve on a y-axis.

After many studies and tests by the applicant, it is known that when the cross-sectional shape of the second grooves 38 satisfies an elliptic curve equation, the backlight module has best brightness effect at the splicing seam 20.

Furthermore, the X ranges between −2.81 mm and 2.81 mm. The a is greater than 0, and less than or equal to 5.7. The b is greater than 0, and less than or equal to 3.15. Correspondingly, the Y ranges 2.62 mm and 3.15 mm.

Correspondingly, the present application further provides a display device. The display device includes a display panel and the backlight module 100 above-mentioned. The display device and the backlight module 100 are opposite to each other.

Compared with prior art, beneficial effect of the display device provided by the embodiments of the present application is same as beneficial effect of the backlight module provided by the technical solutions above-mentioned, which is not described here.

Figure 9:
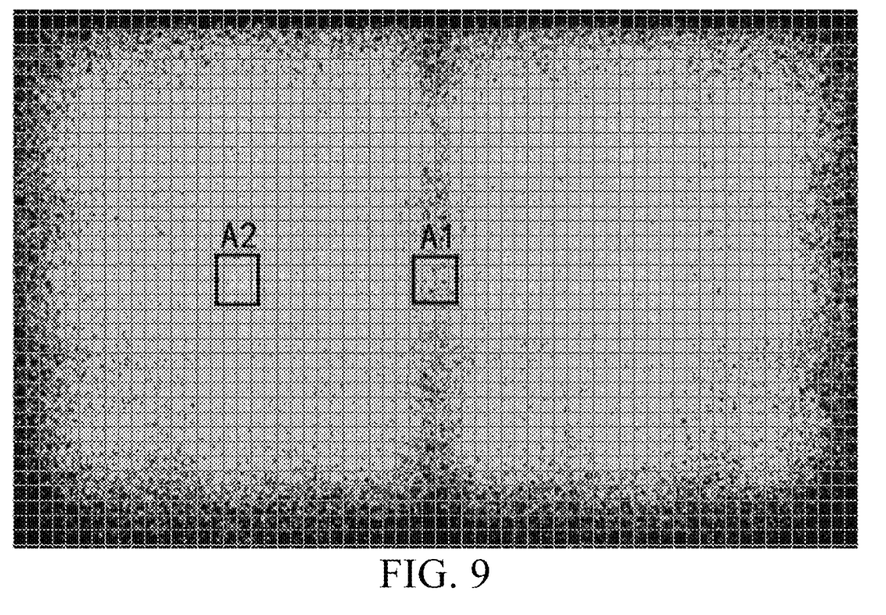
FIG. 9 is a brightness schematic diagram of an existing display device.
Figure 10:
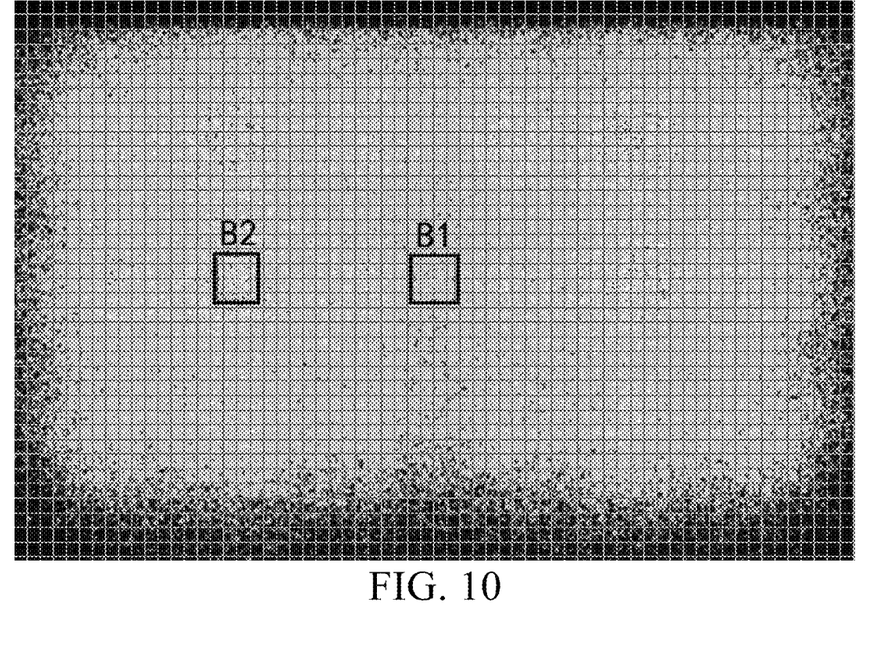
FIG. 10 is a brightness schematic diagram of a display device provided by the present application.

Referring to FIG. 9 and FIG. 10, FIG. 9 is a brightness schematic diagram of an existing display device. FIG. 10 is a brightness schematic diagram of a display device provided by the present application. As may be seen from FIG. 9, the backlight module of the existing display device adopts a structure in which a plurality of LED lamp boards are spliced, and there is a splicing seam between the adjacent LED lamp boards. There is no light refraction structure 30 disposed at the splicing seam of the backlight module of the display device. A brightness of the existing display device at the splicing seam is obviously less than a brightness at the LED lamp boards, and the existing display device has a shadow at the splicing seam. Through experimental analysis, a ratio of the brightness at the splicing seam A1 to the brightness at a center A2 of the LED lamp boards is 42.21%. In the present application, there is the light refraction structure 30 as shown in FIG. 9 disposed at the splicing seam of the backlight module of the display device. As may be seen in FIG. 10, in the display device of the present application, the brightness at the splicing seam is not much different from the brightness at the LED lamp boards. Through the experimental analysis, a ratio of the brightness at the splicing seam B1 to the brightness at a center B2 of the LED lamp boards is 75.41%. As may be seen, the brightness at the splicing seam may be improved in the present application, thereby solving the problem that there are shadows at the splicing seam 20 of the display device.

The backlight module and the display device provided by the embodiments of the present application are described in detail above. The principle and implementations of the present application are described in this specification by using specific examples. The descriptions about the foregoing embodiments is merely provided to help understand the method and core ideas of the present application. In addition, persons of ordinary skill in the art can make modifications in terms of the specific implementations and application scopes according to the ideas of the present application. Therefore, the content of this specification shall not be construed as a limit to the present application.

What is claimed is:

1. A backlight module, comprising:
   at least two light-emitting diode (LED) lamp boards arranged in parallel, wherein a splicing seam is between two adjacent LED lamp boards; and
   a light refraction structure, disposed on a light-emitting side of the LED lamp boards and covering the splicing seam, wherein side surfaces of the light refraction structure adjacent to the two adjacent LED lamp boards are a first refraction surface and a second refraction surface,
   wherein at least one of the first refraction surface and the second refraction surface is provided with grooves.

2. The backlight module according to claim 1, wherein both the first refraction surface and the second refraction surface are cambered surfaces.

3. The backlight module according to claim 2, wherein a radius of each of the cambered surfaces gradually decreases along a light-emitting direction of the LED lamp boards.

4. The backlight module according to claim 1, wherein a light reflection film layer is disposed on a bottom surface of the light refraction structure.

5. The backlight module according to claim 1, wherein there are a plurality of grooves; the LED lamp boards comprise a printed circuit board and LED lamps arranged on the printed circuit board in an array, and each of the plurality of grooves corresponds to each row of the LED lamps on the LED lamp boards adjacent to the plurality of grooves.

6. The backlight module according to claim 5, wherein an orthogonal projection of each row of the LED lamps on the light refraction structure is located in one of the plurality of grooves corresponding to the LED lamps.

7. The backlight module according to claim 6, wherein widths of the plurality of grooves in a column direction gradually decrease along a light-emitting direction of the LED lamp boards.

8. The backlight module according to claim 6, wherein a contour curve of a cross-sectional shape of each of the plurality of grooves parallel to a light-emitting plane of the LED lamp boards satisfies a following curve equation:

$$\frac{X^2}{a^2} + \frac{Y^2}{b^2} = 1,$$

where a is greater than 0, b is greater than 0, X is a coordinate value of a point on the contour curve on an x-axis, and Y is a coordinate value of the point on the contour curve on a y-axis.

9. The backlight module according to claim 8, wherein the X ranges between −2.81 mm and 2.81 mm.

10. The backlight module according to claim 1, further comprising:
    a diffuser plate disposed on the light-emitting side of the LED lamp boards and located above the light refraction structure.

11. The backlight module according to claim 10, wherein a top of the light refraction structure abuts a bottom surface of the diffuser plate.

12. A display device comprising a display panel and a backlight module, wherein the backlight module comprises:
    at least two light-emitting diode (LED) lamp boards arranged in parallel, wherein a splicing seam is between two adjacent LED lamp boards; and
    a light refraction structure disposed on a light-emitting side of the LED lamp boards and covering the splicing seam, wherein side surfaces of the light refraction structure adjacent to the two adjacent LED lamp boards are a first refraction surface and a second refraction surface;
    wherein at least one of the first refraction surface and the second refraction surface is provided with grooves.

13. The display device according to claim 12, wherein both the first refraction surface and the second refraction surface are cambered surfaces.

14. The display device according to claim 13, wherein a radius of each of the cambered surfaces gradually decreases along a light-emitting direction of the LED lamp boards.

15. The display device according to claim 12, wherein a light reflection film layer is disposed on a bottom surface of the light refraction structure.

16. The display device according to claim 12, wherein there are a plurality of grooves; the LED lamp boards comprise a printed circuit board and LED lamps arranged on the printed circuit board in an array, and each of the plurality of grooves corresponds to each row of the LED lamps on the LED lamp boards adjacent to the plurality of grooves.

17. The display device according to claim 16, wherein an orthogonal projection of each row of the LED lamps on the light refraction structure is located in one of the plurality of grooves corresponding to the LED lamps.

18. The display device according to claim 17, wherein widths of the plurality of grooves in a column direction gradually decrease along a light-emitting direction of the LED lamp boards.

* * * * *